Nov. 10, 1942.  D. BEAN  2,301,506
AMUSEMENT DEVICE
Filed Feb. 25, 1942

INVENTOR
Donald Bean
BY John A. Naismith
Atty.

Patented Nov. 10, 1942

2,301,506

UNITED STATES PATENT OFFICE 2,301,506

AMUSEMENT DEVICE

Donald Bean, San Jose, Calif.

Application February 25, 1942, Serial No. 432,306

3 Claims. (Cl. 273—145)

It is one object of my invention to provide a device wherein an element bearing suitable indicia, such as a die, may be manipulated to expose several portions of its surface in succession and then come to rest with some one portion of its surface definitely directed upwardly, and wherein the said element is quickly brought to rest instead of being carried through a prolonged period of agitation.

It is also an object to provide a device of the character indicated that will maintain the die in such a position as to make the markings thereon readily discernible regardless of the position in which the device comes to rest, and one in which the die or element may be shifted from one position to another by imparting a very slight movement to its container.

With these and other objects in view the invention consists in the several features hereinafter described and shown in the drawing, in which.

Figure 1:
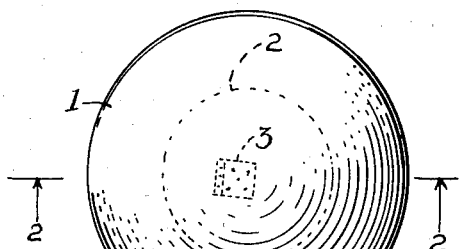
Figure 1 is a top plan view of a device embodying my invention.

Referring now more particularly to the drawing, I show at 1 a hollow sphere made of suitable transparent material such as "lucite," and within the sphere 1 is placed a much smaller hollow sphere, as 2, which in turn contains one or more rollable elements as indicated at 3.

Each of the spheres 1 and 2 is hermetically sealed, and the larger sphere 1 is filled with water, or any other suitable liquid, in which the smaller sphere 2 floats. The smaller sphere 2 is filled with air, or any suitable gas, so that the element 3 may tumble about freely therein. The water filled interior chamber of sphere 1 is indicated by reference character 4, and the gas filled interior of sphere 2 is indicated by the reference character 5.

Since the sphere 2 is made of light weight and transparent material such as "lucite," and has only a gaseous filling, it readily floats in the liquid filled sphere 1, and it maintains this uppermost position regardless of the shape or form of sphere 1, and regardless of the movement imparted thereto. Furthermore, since the sphere 2 is in constant contact with the top of sphere 1, and the latter is filled with liquid, it follows that any rocking or rolling movement of sphere 1 is short lived since the gas-filled sphere 2 operates to bring it quickly to a rest, the movement of sphere 2 being resisted by liquid 4, and the contact of sphere 2 with sphere 1 operating to retard its movement.

Figure 2:
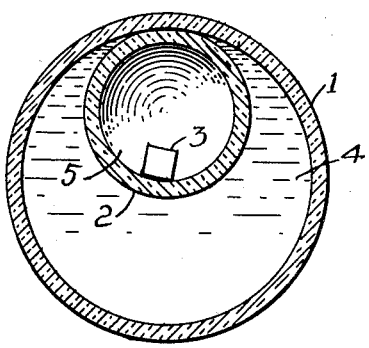
Figure 2 is a sectional view on line 2—2, Fig. 1.
Figure 3:
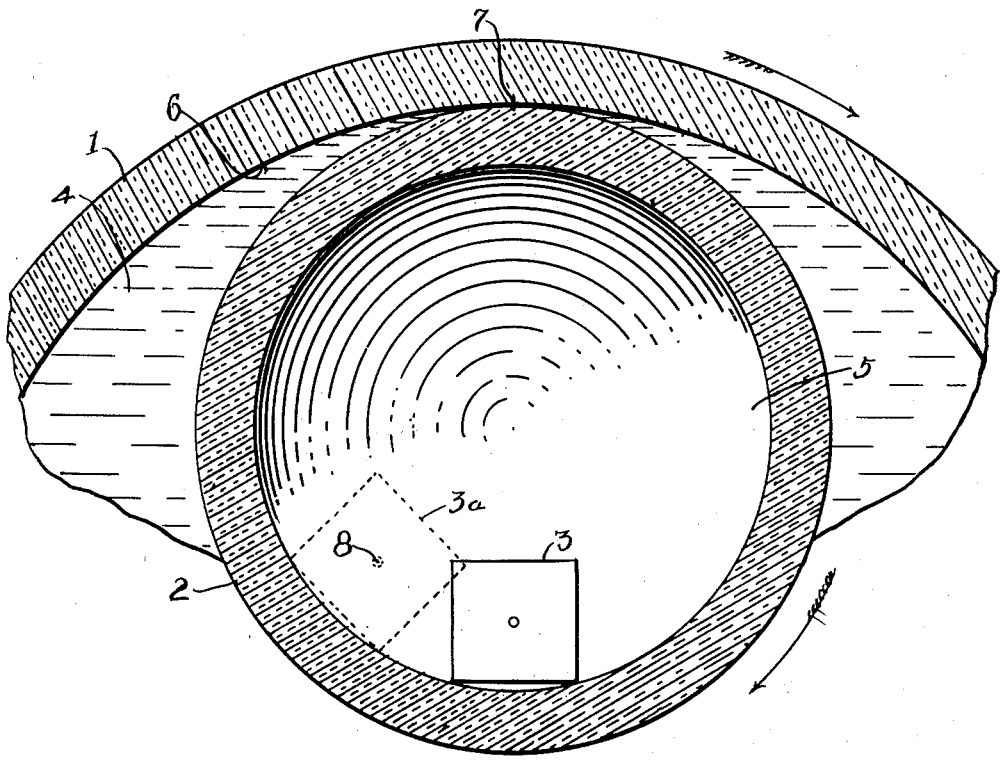
Figure 3 is an enlarged view of the upper portion of the section shown in Figure 2.

The result of the arrangement above described is, that any element, such as a die, that is freely rollable in sphere 2 is likewise quickly brought to rest after a rolling motion has been imparted thereto. If the two spheres 1 and 2 are of the relative sizes shown in Figure 2 only a slight rolling motion of sphere 1 is necessary to effect displacement of the die. It is clearly shown in Figure 3, which is a four-times enlargement, that if the sphere 1 is rolled to bring point 6 to point 7, the small sphere 2 is rotated sufficiently far to carry the die 3 to the position 3a where its center of gravity 8 passes the vertical and the die topples over.

A variation of the above described operation is when the device is held in the hand and shaken rapidly in any direction. In this case the inertia of the liquid prevents movement of the sphere 2 in sphere 1, causing the element 3 to be tumbled about but also permitting, or causing, the said element to come to rest instantly when the shaking is stopped.

This device may be made in almost an infinite number of forms, and the element 3 may be almost infinitely varied, since the device may afford more amusement to children when the element is appropriately ornamented than to adults as a dice throwing means.

Although but one specific embodiment of the invention has been herein illustrated and described, it will be understood that various alterations in the details of construction and assembly may be made without departing from the scope of the invention as indicated in the accompanying claims.

I claim:

1. An article of manufacture comprising, a hollow, rollable, transparent body having the major portion of its interior filled with liquid, a smaller rollable, hollow transparent body filled with aeroform fluid disposed in the remaining portion of the first body, and one or more tumbler bodies disposed in the second body.

2. An article of manufacture comprising, a movable hollow, transparent body, liquid filling the major portion of said body, a smaller freely movable hollow transparent body filling the remaining portion of said first body, an aeroform fluid filling said smaller body, and a tumbler element disposed in said smaller body.

3. An article of manufacture comprising, a hollow, transparent, thin-walled, spherical body having the major portion of its interior filled with liquid, a hollow, transparent, thin-walled substantially spherical body filled with aeroform fluid disposed in the remaining portion of said first body, and a tumbler body disposed in said second body.

DONALD BEAN.